Aug. 16, 1927.
R. K. BAILEY
1,639,627
NUT BOWL FITTING
Filed April 21, 1926
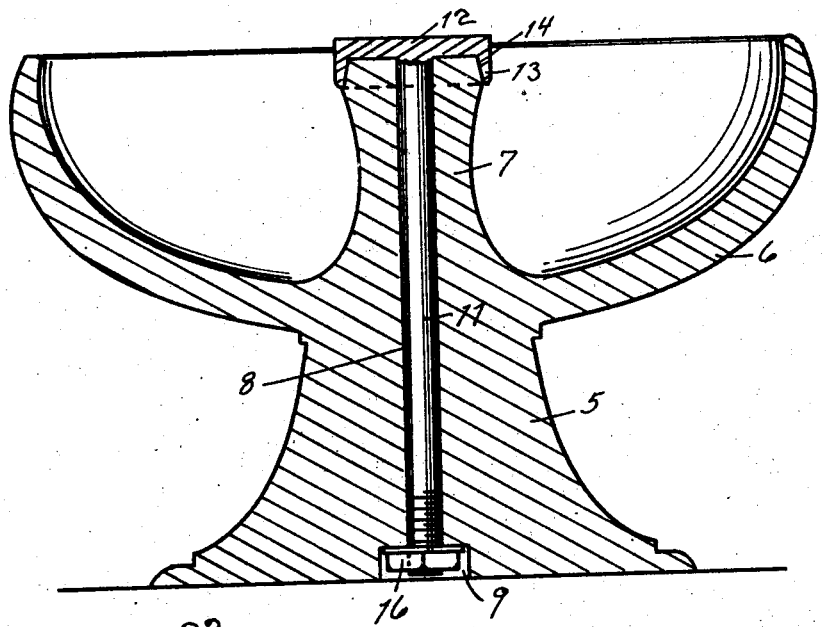
Fig. I.
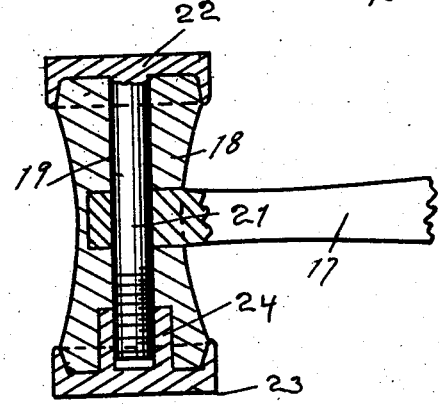
Fig. II.
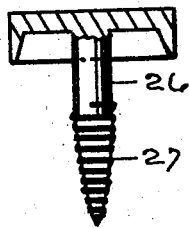
Fig. III.
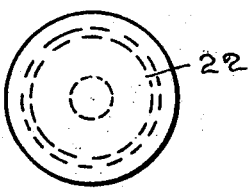
Fig. IV.
INVENTOR.
R. K. BAILEY
BY
ATTORNEY.

Patented Aug. 16, 1927.

1,639,627

UNITED STATES PATENT OFFICE.

RAYMOND K. BAILEY, OF NOGALES, ARIZONA.

NUT-BOWL FITTING.

Application filed April 21, 1926. Serial No. 103,594.

This invention relates to improvements in nut bowl fittings.

The principal object of this invention is to produce a fitting which may be employed with a nut bowl and hammer therefor, for the purpose of permitting a nut to be cracked upon the bowl without the danger of splitting the same.

Another object is to produce a fitting which will so engage the anvil portion of the nut bowl as to compress the material thereof thereby strengthening the bowl.

An additional object is to produce a device of this character which may be applied to the percussion ends of the hammer, which fitting will be identical with that employed in the bowl, with the exception of the length of the bolt.

A still further object is to produce a device of this character which will be cheap to manufacture.

Other objects and advantages will be apparent during the course of the following description.

In the accompanying drawings forming a part of this specification, and in which like numerals are employed to designate like parts throughout the same, Figure I is a vertical cross section of my nut bowl having my device applied thereto, Figure II is a fragmentary detail view showing the cross section of a hammer head having my invention applied thereto, Figure III is a modified form of my invention, and Figure IV is a top plan view of my invention.

It is common to construct nut bowls out of wood, fibre and similar materials which do not possess any great amount of strength and to form in these bowls an anvil or upstanding portion, upon which a nut may be cracked. In order to protect this upstanding portion, I have devised a fitting which may be readily applied thereto and one which will protect the bowl against damage, one which wil strengthen the bowl and dissipate the shock thereover.

In the accompanying drawings wherein for the purpose of illustration is shown a preferred embodiment of my invention, the numeral 5 designates the pedestal of a nut bowl, the numeral 6 the bowl thereof and the numeral 7 an upstanding portion formed within the bowl.

This bowl forms no part of my invention. I form a bore 8 through the upstanding portion 7 and the pedestal 5 and an enlarged bore at 9.

Within the bore 8 I place a rod 11 having an anvil 12 formed thereon. This anvil has a downwardly extending annular rim 13 and by viewing the figure, it will be noted that the inner surface of this rim is slanted as shown at 14.

At 16 I have shown a nut adapted to fit within the bore 9 and to threadedly engage the rod 11. This nut serves to draw the anvil 12 into intimate contact with the upstanding portion 7. At the same time the tapered edge 14 serves to compress the material of which the upstanding portion is formed and to thereby make a better fit between the anvil and the upstanding portion than would, otherwise, be the case.

Referring now to Figure II the numeral 17 refers to the handle of a hammer carrying a head 18. This head 18 may be formed of wood or any similar material and has a bore 19 therethrough. This bore 19 corresponds to the bore 8 and has extending therethrough a rod 21 which corresponds to the rod 11.

Upon this rod 21 a percussion head 22 is formed which corresponds to the anvil 12. A similar percussion head is shown at 23 which is provided with a tubular portion 24 which tubular portion threadedly engages the rod 21.

It will be noted that this rod 21 passes through the handle 17, the result being that the handle cannot be withdrawn from the head 18 without removing the rod 21, as the same forms a lock.

In the modified form shown in Figure III the rod 26 is provided with a screw-thread 27. The remaining parts being the same as previously described.

It will thus be seen that my invention may be applied to the bowl and to the hammer in the same manner, the only difference being the length of the rods 11 or 21, it merely being necessary to shorten the rod in accordance with the use to which it is being put.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described the combination with a nut bowl having a bore formed therethrough, of a rod passing through said bore, an anvil secured to said rod, said anvil having a depending internally tapered annular flange, means for securing said rod and said anvil to said bowl in such a manner as to compress the fiber of said bowl at its point of contact with said flange.

2. In a device of the character described, the combination with a bowl having a pedestal and an upstanding portion formed within the bowl, a bore formed through said upstanding portion and said pedestal, an anvil adapted to be secured on said upstanding portion and a downwardly extending internally tapered annular flange formed on said anvil and adapted to engage the upper extremity of said upstanding portion in such a manner as to compress the fiber of said upstanding portion at its point of contact with said tapered claims.

3. In a device of the character described, a nut engaging implement comprising a contacting surface, a rod extending from said contacting surface, a depending interiorly tapered ring formed on said contacting surface and being adapted to compress the fiber of any material brought thereagainst, and means for retaining said contacting surface in operative position.

In testimony whereof I affix my signature.

RAYMOND K. BAILEY.